(12) United States Patent
Quesada Perez et al.

(10) Patent No.: US 7,390,358 B2
(45) Date of Patent: Jun. 24, 2008

(54) MODIFIED KAOLIN COMPOSITIONS AND METHODS FOR MAKING SAME

(75) Inventors: Andres M. Quesada Perez, Caracas (VE); Gerardo Vitale-Rojas, Edo Miranda (VE)

(73) Assignee: Intevep, S.A. (VE)

( * ) Notice: Subject to any disclaimer, the term of this patent is extended or adjusted under 35 U.S.C. 154(b) by 143 days.

(21) Appl. No.: 11/118,289

(22) Filed: Apr. 29, 2005

(65) Prior Publication Data

US 2005/0261122 A1 Nov. 24, 2005

(51) Int. Cl.
*C04B 2/00* (2006.01)

(52) U.S. Cl. .................... 106/799; 106/492; 502/80

(58) Field of Classification Search ............... 106/486, 106/799, 492; 502/63, 64, 65, 66, 67, 68, 502/69, 70, 71, 72, 73, 74, 80, 82, 83
See application file for complete search history.

(56) References Cited

U.S. PATENT DOCUMENTS

| | | | | |
|---|---|---|---|---|
| 2,477,664 A | * | 8/1949 | Shabaker | ............ 502/80 |
| 3,210,266 A | * | 10/1965 | De Baun et al. | ........ 208/120.01 |
| 3,437,441 A | * | 4/1969 | Mays et al. | ............. 423/118.1 |
| 4,764,356 A | * | 8/1988 | Bortinger et al. | ............ 423/707 |
| 4,968,650 A | * | 11/1990 | Chu et al. | ............... 502/61 |
| 5,082,815 A | * | 1/1992 | Macedo | ............ 502/68 |
| 5,173,463 A | * | 12/1992 | Macedo | ............ 502/68 |
| 5,500,109 A | * | 3/1996 | Keville et al. | ............ 208/111.3 |
| 5,690,810 A | * | 11/1997 | Lawrence et al. | ............ 208/135 |
| 6,114,267 A | * | 9/2000 | Ghosh et al. | ............ 502/68 |
| 2002/0160906 A1 | * | 10/2002 | Chen et al. | ............ 502/63 |
| 2004/0235642 A1 | * | 11/2004 | Xu et al. | ............ 502/68 |

* cited by examiner

*Primary Examiner*—J. A. Lorengo
*Assistant Examiner*—Pegah Parvini
(74) *Attorney, Agent, or Firm*—Bachman & LaPointe, P.C.

(57) ABSTRACT

A method for preparing a modified kaolin clay, includes the steps of providing a kaolin clay material having a starting ratio of silica to alumina; mixing the kaolin clay material with acid so as to form a substantially homogenous paste; calcining the paste so as to provide a calcined acid-treated clay material; mixing the calcined acid-treated clay material in water so as to form a suspension; precipitating aluminum from the suspension so as to produce a reduced aluminum suspension; and obtaining a modified clay material from the reduced aluminum suspension, wherein the modified clay material has a final ratio of silica to alumina which is higher than the starting ratio.

25 Claims, 4 Drawing Sheets

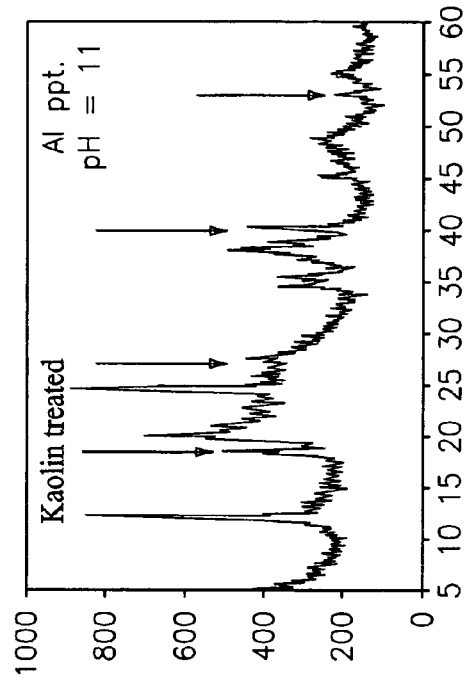
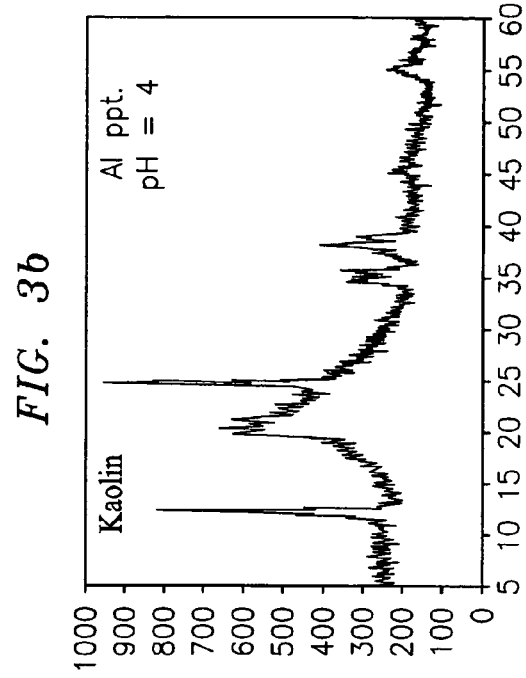
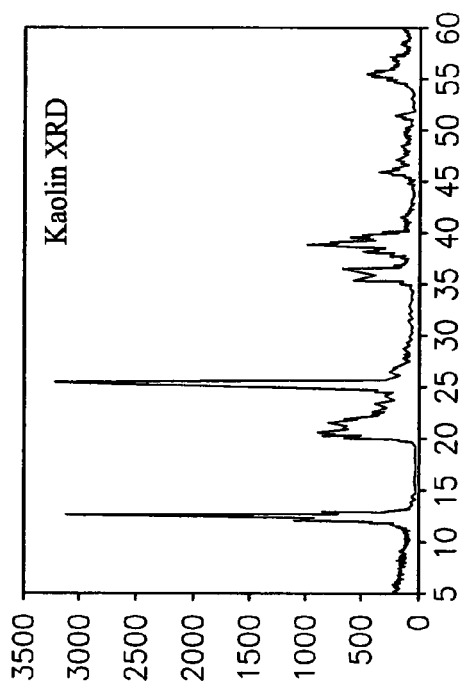
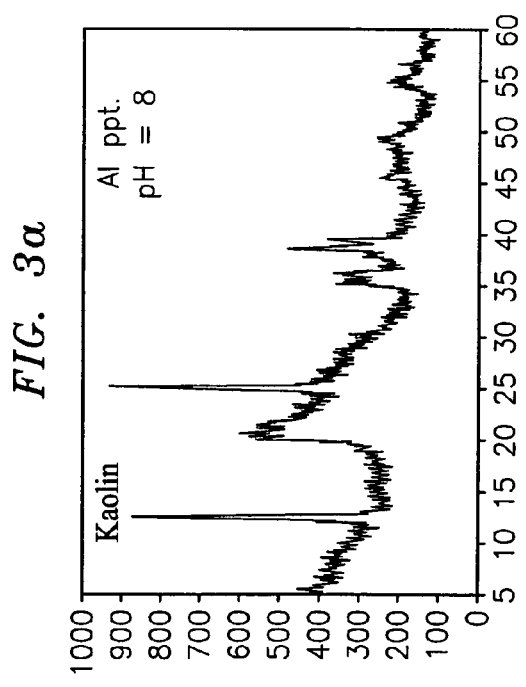

MODIFIED KAOLIN COMPOSITIONS AND METHODS FOR MAKING SAME

BACKGROUND OF THE INVENTION

The invention relates to modified kaolin compositions and methods for preparing same.

Kaolin and other clays have been used as catalysts and catalyst components. Various methods have been used for modifying the clay to try to improve characteristics of the clay.

Despite these efforts, the need remains for catalysts which are useful under extreme conditions, for example those used in fluid catalytic conversion, wherein many catalysts are rapidly deactivated.

It is therefore the primary object of the present invention to provide a modified kaolin clay composition which is useful in hydrocarbon processing methods such as fluid catalytic cracking and the like.

It is a further object of the invention to provide such a composition which can be used to protect other catalyst components from deactivation.

It is a still further object of the invention to provide a method for preparing a modified kaolin clay composition.

Other objects and advantages of the present invention will appear herein below.

SUMMARY OF THE INVENTION

In accordance with the present invention, the foregoing objects and advantages have been readily attained.

According to the invention, a method is provided for preparing a modified kaolin clay, which method comprises the steps of: providing a kaolin clay material having a starting ratio of silica to alumina; mixing said kaolin clay material with acid so as to form a substantially homogenous paste; calcining the paste so as to provide a calcined acid-treated clay material; mixing said calcined acid-treated clay material in water so as to form a suspension; precipitating aluminum from said suspension so as to produce a reduced aluminum suspension; and obtaining a modified clay material from said reduced aluminum suspension, wherein said modified clay material has a final ratio of silica to alumina which is higher than said starting ratio.

Still further according to the invention, a modified kaolin clay composition is provided which has a ratio of silica to alumina greater than about 2 and preferably at least about 8. This composition and the method for making same can be used to protect zeolite from deactivation, for example during use in FCC processes. According to the invention, the zeolite and modified clay can be co precipitated which results in a combined final composition wherein the modified clay protects the zeolite from deactivation as desired.

BRIEF DESCRIPTION OF THE DRAWINGS

A detailed description of preferred embodiments of the present invention follows, with reference to the attached drawings, wherein:

FIGS. 2a-d and 3a-d show XRD patterns for various treated kaolin clays; and

DETAILED DESCRIPTION

The invention relates to a modified kaolin clay composition and a method for making same.

Kaolin is one of several types of clay, and is also referred to as china clay or paper clay. The clay typically has a composition of about 46% wt $SiO_2$, 40% wt $Al_2O_3$ and 14% wt $H_2O$.

While various methods have been developed in the prior art for adapting kaolin clay to certain uses, it has been found in accordance with the present invention that a particular method for preparation including acid treatment and controlled precipitation provides an end modified kaolin clay having desirable properties for use as an FCC catalyst or catalyst additive.

Figure 1:
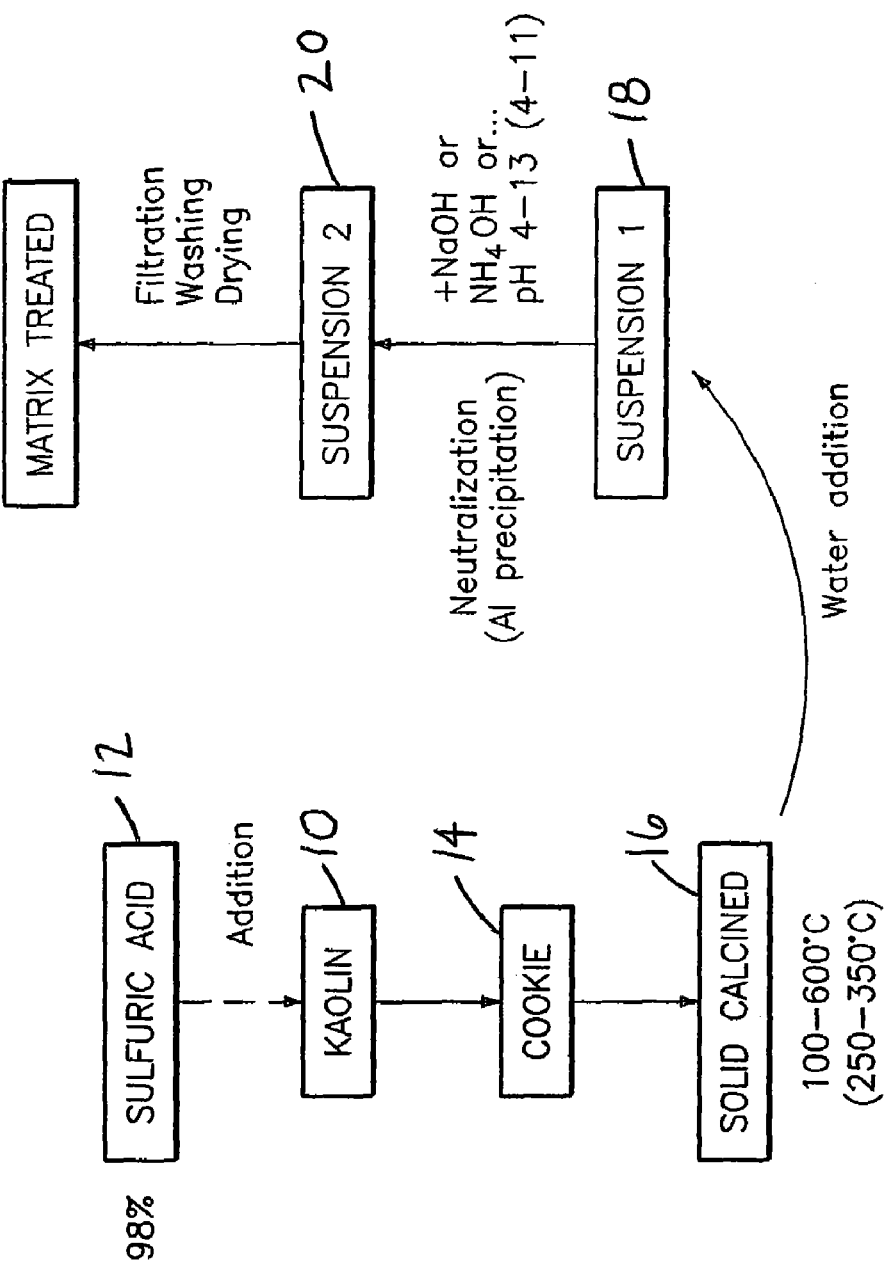
FIG. 1 schematically illustrates a process according to the invention.

FIG. 1 shows a schematic representation of a method for preparing the modified clay in accordance with the invention. As shown, a starting kaolin material 10 is mixed with a concentrated acid 12, in this case a 98% wt sulfuric acid, to form a substantially homogeneous paste 14.

This paste is preferably formed into a cookie, cake or other discrete shape, as desired, and treated in a calcining step 16 to provide a calcined kaolin-acid mixture.

According to the invention, water is then added to the mixture so as to provide a suspension 18. This suspension typically at this point has a pH of less than about 4. According to the invention, pH adjusting additives are then added to suspension 18 so as to increase the pH and precipitate aluminum, preferably so as to sequentially increase the pH from the starting point to 4, then to 7 and then to 11. This pH adjustment results in an aluminum precipitation from suspension 18 so as to provide a reduced aluminum suspension 20. Suspension 20 is then treated to obtain the desired modified clay material, preferably by filtration, washing and drying using known techniques.

The final modified clay material advantageously has an increased ratio of silica to alumina by virtue of the removed aluminum.

The acid to be mixed with the kaolin is preferably a concentrated acid, for example, a solution of acid having a concentration of 98% wt based upon the solution. A preferred acid for use in accordance with the present invention is sulfuric acid. Of course, other acids can be used within the broad scope of the present invention. The mixing with kaolin at this stage is preferable carried out so as to provide a substantially homogenous paste of the acid and clay. During this mixing, the acid interacts with the aluminum so that the subsequent pH adjusting steps advantageously serve to allow aluminum to precipitate out of the suspension.

The calcining step has been found to be important in connection with providing the desired final product. This step is preferably carried out at a temperature of between about 100 and about 600° C., preferably between about 250 and about 350° C.

The pH adjusting step is advantageously carried out by adding a pH adjusting additive, preferably NaOH, NH4OH or the like, to the suspension in stages so as to provide the desired sequential neutralization of the pH of the suspension. This neutralization advantageously serves to bring about the precipitation of aluminum containing salts from which suspension 20 is separated for further treatment in accordance with the invention.

Figure 2B:
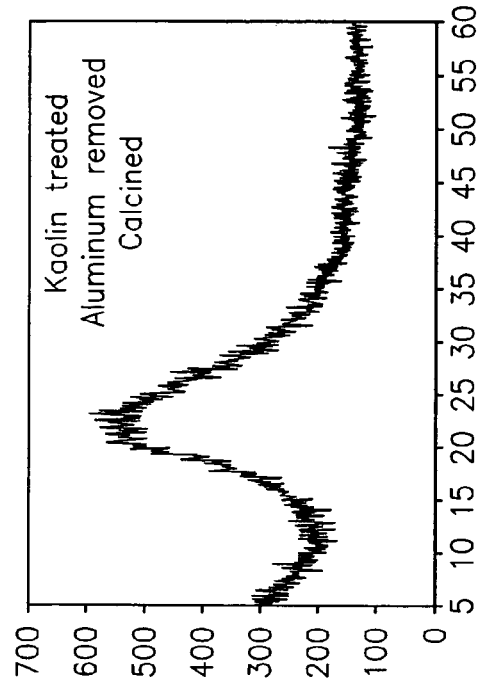
Figure 2D:
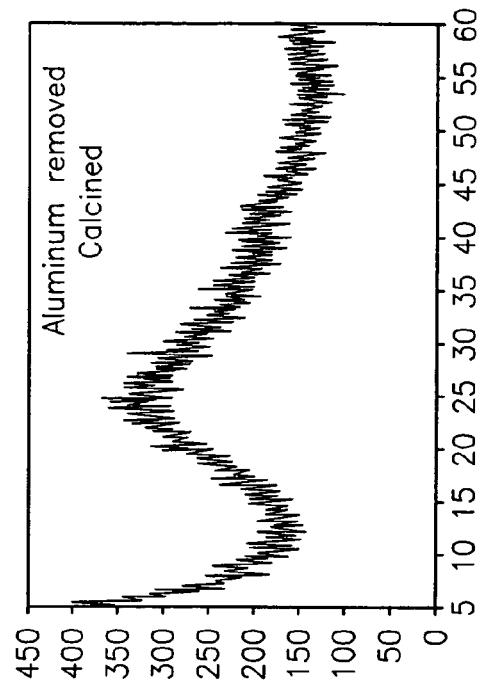
Figure 2A:
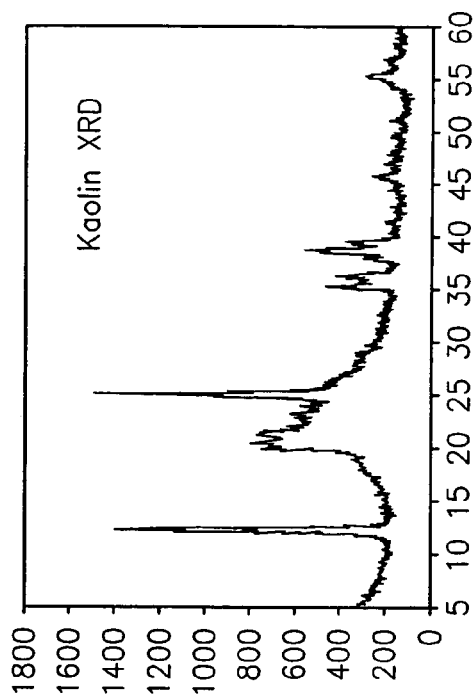
Figure 2C:
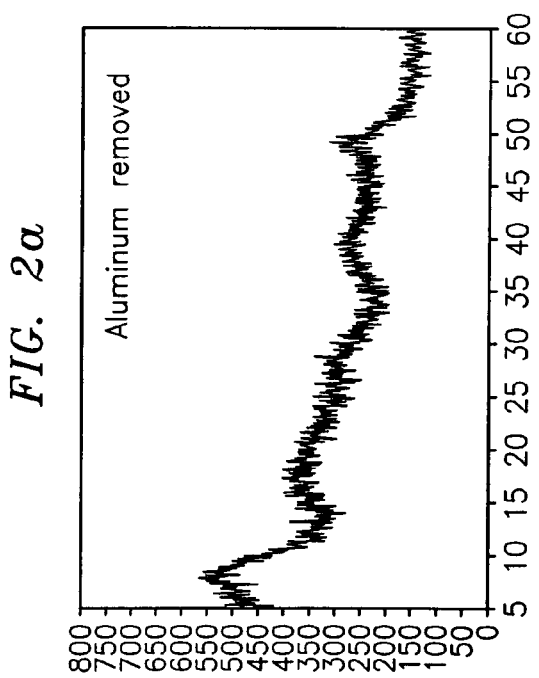

The aluminum precipitation step of the present invention produces a modified product which has very important differences in connection with XRD patterns. FIGS. 2 and 3 show XRD patterns for starting and resulting materials. FIG. 2a shows XRD pattern for kaolin material before treatment and shows a profile characteristic of the normal aluminum content. FIGS. 2b-d show XRD patterns for treated kaolins and show a smoothing of the resulting signal. FIGS. 3a-d show XRD patterns for untreated kaolin and for kaolin treated with acidic media and precipitated at different pH levels.

As set forth above, the prior art includes teachings such as U.S. Pat. No. 5,173,463 among others which teach a near complete removal of aluminum from the clay. In accordance with the present invention, a smaller and different portion of the aluminum was removed. This difference is highlighted in Table 1 below which shows amounts of Si and Al, as well as ratios of Si/Al and silica/alumina for kaolin starting material, kaolin treated according to the prior art, resulting aluminum removed according to the prior art, and kaolin treated at several different pH levels according to the prior art.

TABLE 1

| Samples | Si(% wt) | Al(% wt) | Si/Al | $SiO_2/Al_2O_3$ |
|---|---|---|---|---|
| Kaolin(w/o Al) | 33 | 7.6 | 4.17 | 8.34 |
| Al (ppt) | 10.2 | 26.8 | 0.37 | 0.74 |
| Treated K(pH11) | 19.4 | 16.1 | 1.16 | 2.32 |
| Treated K(pH 7) | 20.5 | 14.9 | 1.32 | 2.64 |
| Treated K(pH 4) | 21.7 | 14.2 | 1.47 | 2.94 |
| Kaolin (starting) | 21.8 | 20.9 | 1.00 | 2.00 |

As shown, the material treated in accordance with the present invention has a very different composition than the starting kaolin material and also as compared to the material treated according to the prior art which results in substantial aluminum removal. The resulting treated kaolin material has been found according to the invention to be especially useful in the treatment of hydrocarbons, for example in FCC processes, because the treated kaolin itself is resistant to deactivation at typical FCC conditions and, further, can be used to protect a zeolite from deactivation which would normally occur when used under such conditions.

According to the invention, the resulting material has characteristics which are different from the starting kaolin material. Starting kaolin material has a surface area of about 10-20 m2/g. The treated kaolin according to the invention, however, has a surface area of between about 50 and about 400, preferably between about 100 and about 300 m2/g. The process of the present invention also brings about important changes in average pore diameter of the material. Untreated kaolin has a pore diameter which is substantially 0. Kaolin treated according to the invention, however, has an average pore diameter which is between about 30 and about 300 A. In connection with pore volume, the treated material advantageously has a pore volume of between about 0.1 and about 0.5 cc/g. Finally, the modified material in accordance with the present invention has an acidity, for example measured using pyridine IR spectroscopy, showing Bronsted/Lewis numbers of between about 0.01 and about 0.4.

The modified clay according to the invention also has been found to show excellent stability in these physical characteristics after treatment under FCC conditions. For example, after treatment at a temperature of 1450° F., for a period of 5 hours and at 100% water, the modified clay material of the present invention still has a surface area of between about 30 and about 200 m2/g, an average pore diameter of between about 100 and about 200 A and a pore volume of between about 0.1 and about 0.4 cc/g.

As set forth above, the methods of the present invention can also be used to prepare a co-precipitated zeolite composition wherein the modified clay protects the zeolite from deactivation during FCC processing.

Figure 4:
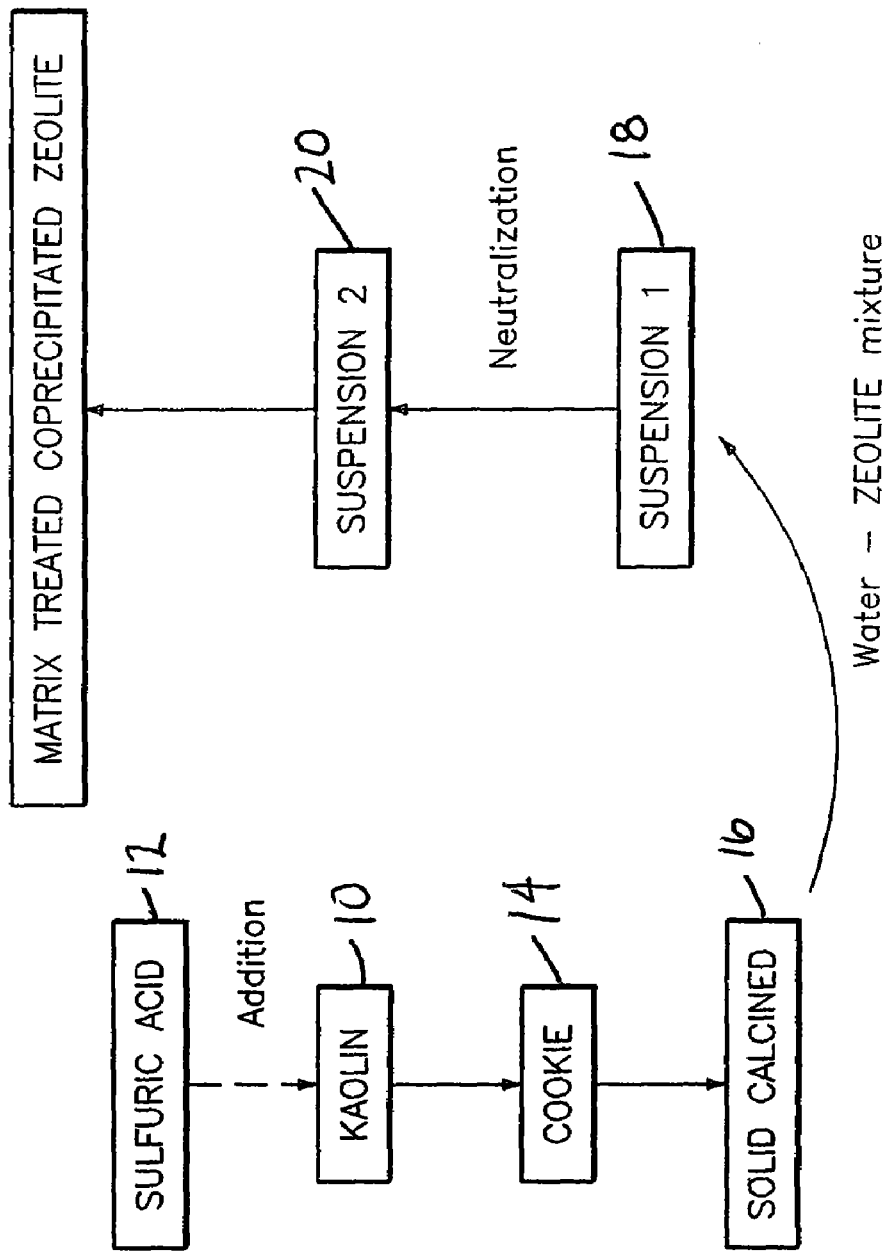
FIG. 4 schematically illustrates a further process according to the invention wherein kaolin and zeolite are co precipitated.

According to the invention, and referring to FIG. 4, the method for preparation begins the same way with preparation of a substantially homogenous paste 14 of kaolin 10 and concentrated acid 12, preferably sulfuric acid. The paste is formed into a desired shape if necessary and then calcined as shown in step 16. This produces a calcined acid-clay composition which is then placed into a water-zeolite mixture to form a suspension 17 as shown. This suspension is then treated using the neutralizing steps as set forth above to produce a second suspension 19 from which aluminum has precipitated. During this step, there is also interaction between the zeolite and the clay which allows for obtaining a final co-precipitated clay/zeolite composition in accordance with the present invention.

Preparing the composition in this manner produces a very different product as compared to a mere physical mixture of the matrix and zeolite materials. Important differences are observed in both acid site distribution and in the surface area of the zeolite following hydrothermal deactivation. In connection with acid site distribution physical mixture produces much higher distribution of weak signals (W) as compared to medium (M) or strong (S) signals, while the co-precipitated composition produces much more evenly distributed acid sites. Table 2 below shows acid strengths for samples of each, and clearly shows a striking difference.

TABLE 2

| Acid strength | Co-precipitation (μmol/g) | Physical mixture (μmol/g) |
|---|---|---|
| W | 50.6 ($Bronsted_{200°\,C.}$ – $Bronsted_{400°\,C.}$) | 111.3 ($Bronsted_{200°\,C.}$ – $Bronsted_{400°\,C.}$) |
| M | 54.3 ($Bronsted_{400°\,C.}$ – $Bronsted_{530°\,C.}$) | 4.9 ($Bronsted_{400°\,C.}$ – $Bronsted_{530°\,C.}$) |
| S | 34.5 ($Bronsted_{530°\,C.}$) | 41.8 ($Bronsted_{530°\,C.}$) |

As shown in Table 2, co-precipitation according to the invention results in a composition wherein W, M and S are roughly evenly distributed, and all within a band of less than or equal to about 40 μmol/g, more preferably less than or equal to about 30 μmol/g and ideally less than or equal to about 20 μmol/g. For example, the values in Table 2 all fall within a band of 20 μmol/g, that is, the lowest is 34.5 μmol/g and the largest is 54.3 μmol/g.

In contrast, the physical mixture sample of Table 2 includes a low valve of 4.9 μmol/g for M and a high value of 111.3 μmol/g for W, which defines a band of over 100 μmol/g.

In connection with surface area, when a physical mixture of zeolite and modified clay was tested after hydrothermal deactivation, the zeolite showed a reduction of about 37% in surface area. For the co-precipitated product, the surface area of the zeolite remained substantially unchanged.

It should be appreciated that a method has been provided in accordance with the invention for treating kaolin so as to provide an improved material which is useful as a catalyst, or catalyst matrix or support, especially for use in processes wherein catalyst deactivation is an issue. Further, the modified clay can be co-precipitated with zeolite to produce a product which is especially useful as the modified clay protects the zeolite from deactivation.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for preparing a modified kaolin clay, comprising the steps of:
   providing a kaolin clay material having a starting ratio of silica to alumina;
   mixing said kaolin clay material with acid so as to form a substantially homogenous paste;
   calcining the paste so as to provide a calcined acid-treated clay material, wherein said calcining step is carried out at a temperature of between about 250 and about 350° C.;
   mixing said calcined acid-treated clay material in water so as to form a suspension;
   precipitating aluminum from said suspension so as to produce a reduced aluminum suspension, wherein said precipitation step is sequentially carried out at a pH of 4, 7, and 11;
   obtaining a modified clay material from said reduced aluminum suspension, wherein said modified clay material has a final ratio of silica to alumina which is higher than said starting ratio.

2. The method of claim 1, wherein said precipitating step comprises adjusting pH of said suspension so as to cause said precipitation.

3. The method of claim 2, wherein said adjusting step comprises adjusting the pH of said suspension to a value of between about 4 and about 13.

4. The method of claim 2, wherein said adjusting step comprises adding a pH adjusting additive to said suspension.

5. The method of claim 4, wherein said pH adjusting additive is selected from the group consisting of NaOH, $NH_4OH$ and combinations thereof.

6. The method of claim 1, wherein said acid is sulfuric acid.

7. The method of claim 6, wherein said sulfuric acid is concentrated sulfuric acid.

8. The method of claim 7, wherein the sulfuric acid is a concentrated solution having a concentration of about 98% wt based upon said solution.

9. The method of claim 1, wherein said obtaining step comprises filtering, washing and drying said reduced aluminum suspension so as to provide said modified clay material.

10. The method of claim 1, wherein the modified clay has a surface area of between about 50 and about 400 $m^2/g$.

11. The method of claim 1, wherein the modified clay has an average pore diameter of between about 30 and about 300 A.

12. A method for preparing a modified kaolin clay, comprising the steps of:
   providing a kaolin clay material having a starting ratio of silica to alumina;
   mixing said kaolin clay material with acid so as to form a substantially homogenous paste;
   calcining the paste so as to provide a calcined acid-treated clay material;
   mixing said calcined acid-treated clay material in water so as to form a suspension;
   precipitating aluminum from said suspension so as to produce a reduced aluminum suspension, wherein said precipitation step is sequentially carried out at a pH of 4, 7, and 11;
   obtaining a modified clay material from said reduced aluminum suspension, wherein said modified clay material has a final ratio of silica to alumina which is higher than said starting ratio, wherein said water further contains zeolite, and wherein said modified clay material contains said zeolite.

13. The method of claim 1, wherein the modified clay has a pore volume of between about 0.1 and about 0.5 cc/g.

14. The method of claim 1, wherein the modified clay has Bronsted/Lewis acidity of between about 0.01 and about 0.4.

15. A modified kaolin clay composition having a ratio of silica to alumina of greater than 2, wherein the modified clay exhibits a substantially even acid site distribution.

16. The composition of claim 15, wherein the composition also contains zeolite.

17. The composition of claim 15, wherein the modified clay has a surface area of between about 50 and about 400 $m^2/g$.

18. A method for preparing a modified kaolin clay, comprising the steps of:
   providing a kaolin clay material having a starting ratio of silica to alumina;
   mixing said kaolin clay material with acid so as to form a substantially homogenous paste;
   calcining the paste so as to provide a calcined acid-treated clay material;
   mixing said calcined acid-treated clay material in water so as to form a suspension;
   precipitating aluminum from said suspension so as to produce a reduced aluminum suspension;
   obtaining a modified clay material from said reduced aluminum suspension, wherein said modified clay material has a final ratio of silica to alumina which is higher than said starting ratio, wherein the modified clay exhibits a substantially even acid site distribution.

19. The method of claim 18, wherein said calcining step is carried out at a temperature of between about 100 and about 600° C.

20. The method of claim 19, wherein said calcining step is carried out at a temperature of between about 250 and about 350° C.

21. The composition of claim 15, wherein the modified clay has an average pore diameter of between about 30 and about 300 A.

22. The composition of claim 15, wherein the modified clay has a pore volume of between about 0.1 and about 0.5 cc/g.

23. The composition of claim 15, wherein the modified clay has Bronsted/Lewis acidity of between about 0.01 and about 0.4.

24. The composition of claim 15, wherein the modified clay, after treatment under FCC conditions including a temperature of about 1450° F. for a period of about 5 hours with 100% water, maintains a surface area of between about 30 and about 200 $m^2/g$, an average pore diameter of between about 100 and about 200 A and a pore volume of between about 0.1 and about 0.4 cc/g.

25. The composition of claim 16, wherein the modified clay, after treatment under FCC conditions including a temperature of about 1450° F. for a period of about 5 hours with 100% water, maintains a surface area of between about 30 and about 200 $m^2/g$, an average pore diameter of between about 100 and about 200A and a pore volume of between about 0.1 and about 0.4 cc/g, and wherein the zeolite has a surface area which is substantially the same.

* * * * *